(12) United States Patent
Watson et al.

(10) Patent No.: US 10,827,167 B2
(45) Date of Patent: **\*Nov. 3, 2020**

(54) SYSTEMS AND METHODS FOR DYNAMICALLY ADJUSTING A SYNTHETIC VIEW OF A SCENE FOR SHOWING THE SCENE FROM A VIRTUAL CAMERA PERSPECTIVE

(71) Applicant: Disney Enterprises, Inc., Burbank, CA (US)

(72) Inventors: Scott F. Watson, Marina Del Rey, CA (US); Lanny S. Smoot, Thousand Oaks, CA (US)

(73) Assignee: Disney Enterprises, Inc., Burbank, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/693,049

(22) Filed: Nov. 22, 2019

(65) Prior Publication Data

US 2020/0092536 A1 Mar. 19, 2020

Related U.S. Application Data

(63) Continuation of application No. 15/140,375, filed on Apr. 27, 2016, now Pat. No. 10,523,929.

(51) Int. Cl.
*H04N 7/18* (2006.01)
*H04N 13/366* (2018.01)
(Continued)

(52) U.S. Cl.
CPC ......... *H04N 13/366* (2018.05); *G06F 3/011* (2013.01); *G06T 7/246* (2017.01); *G06T 7/579* (2017.01); *G06T 15/20* (2013.01); *G06T 17/00* (2013.01); *H04N 21/00* (2013.01); *G06T 2207/10016* (2013.01); *G06T 2207/10024* (2013.01); *G06T 2207/30196* (2013.01); *H04N 13/117* (2018.05); *H04N 13/279* (2018.05)

(58) Field of Classification Search
CPC .................................................... H04N 13/366
USPC .......................................................... 348/51
See application file for complete search history.

(56) References Cited

U.S. PATENT DOCUMENTS

5,850,352 A * 12/1998 Moezzi ............... H04N 13/139
345/419
6,665,003 B1 * 12/2003 Peleg .................... G06T 3/4038
348/36
(Continued)

*Primary Examiner* — Leron Beck
(74) *Attorney, Agent, or Firm* — Farjami & Farjami LLP (57) ABSTRACT

There is provided a system including a non-transitory memory storing an executable code and a hardware processor executing the code to receive a video content including a plurality of frames showing a scene from a perspective of a real camera, create a three-dimensional (3D) model of the scene using the plurality of frames, store the 3D model of the scene in the non-transitory memory, construct a synthetic view of the scene showing additional perspectives from one or more virtual cameras at one or more locations in the scene, transmit the synthetic view of the scene for being displayed on a display, display a scene of the video content on the display, track a position of a viewer moving in a room, and adjust the display of the scene being displayed on the display based on the position of the viewer in the room relative to the display.

20 Claims, 5 Drawing Sheets

(51) Int. Cl.
    *G06T 15/20*     (2011.01)
    *G06T 17/00*     (2006.01)
    *H04N 21/00*     (2011.01)
    *G06F 3/01*     (2006.01)
    *G06T 7/246*     (2017.01)
    *G06T 7/579*     (2017.01)
    *H04N 13/279*     (2018.01)
    *H04N 13/117*     (2018.01)

(56) References Cited

U.S. PATENT DOCUMENTS

| | | | |
|---|---|---|---|
| 2003/0038892 A1* | 2/2003 | Wang | H04N 5/2226 348/461 |
| 2005/0216124 A1* | 9/2005 | Suzuki | G05D 1/0272 700/253 |
| 2005/0219695 A1* | 10/2005 | Vesely | H04N 13/122 359/463 |
| 2006/0239400 A1* | 10/2006 | Sukovic | A61B 6/465 378/38 |
| 2009/0002394 A1* | 1/2009 | Chen | G06T 3/0062 345/632 |
| 2010/0188503 A1* | 7/2010 | Tsai | G06F 1/1626 348/142 |
| 2010/0211237 A1* | 8/2010 | Nichols | G08G 5/0021 701/14 |
| 2012/0173050 A1* | 7/2012 | Bernstein | G05D 1/0088 701/2 |
| 2013/0002454 A1* | 1/2013 | Burns | G06F 3/012 340/975 |
| 2017/0126988 A1* | 5/2017 | Holzer | G06T 15/205 |
| 2017/0318283 A1* | 11/2017 | Watson | G06T 7/579 |

\* cited by examiner

SYSTEMS AND METHODS FOR DYNAMICALLY ADJUSTING A SYNTHETIC VIEW OF A SCENE FOR SHOWING THE SCENE FROM A VIRTUAL CAMERA PERSPECTIVE

The present application is a Continuation of U.S. application Ser. No. 15/140,375, filed Apr. 27, 2016.

BACKGROUND

In the past, television displays projected video content onto a convex display using cathode ray tubes. Recent developments in television displays have introduced flat screen displays with substantially higher resolution than conventional cathode ray tube televisions, and further developments have introduced concave television displays. Concave, or curved, displays show content on a screen that is slightly curved towards the viewer, bringing the displayed image into the viewer's peripheral vision. However, images displayed on a conventional display, or even a flat screen display, do not allow the viewer to feel immersed in the video content, because even with the recent advances in technology, the images remain substantially the same when viewed from any position in a viewing area, such as a movie theater or a room.

SUMMARY

The present disclosure is directed to immersive interactive video systems, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
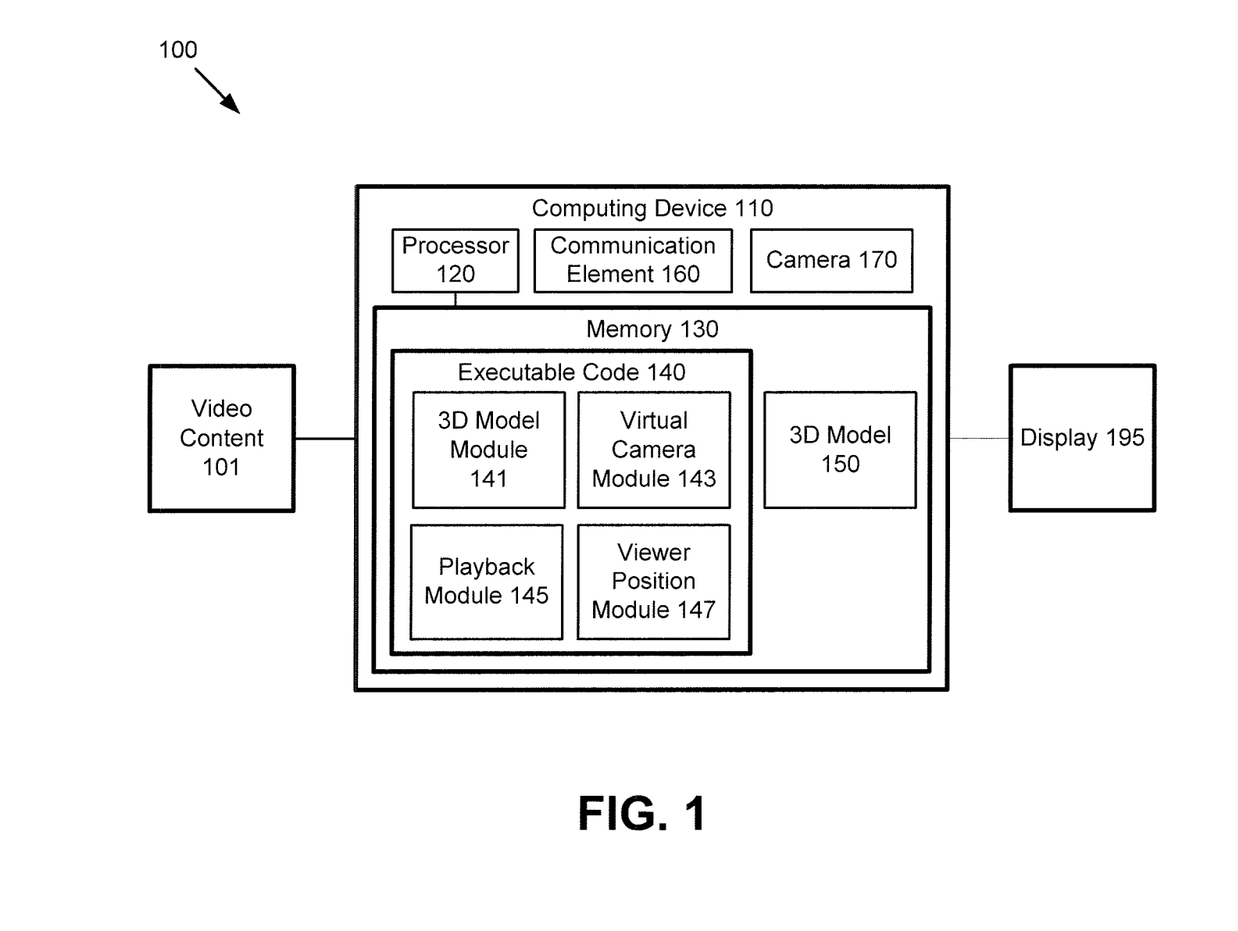
FIG. 1 shows a diagram of an exemplary immersive interactive video system, according to one implementation of the present disclosure.

FIG. 1 shows a diagram of an exemplary immersive interactive video system, according to one implementation of the present disclosure. System 100 includes video content 101, computing device 110, and display 195. Computing device 110 includes processor 120, memory 130, communication element 160, and camera 170. Processor 120 is a hardware processor, such as a central processing unit (CPU) used in computing devices. Memory 130 is a non-transitory storage device for storing computer code for execution by processor 120, and also storing various data and parameters. Memory 130 includes executable code 140 and three-dimensional (3D) model 150.

Video content 101 may be a live video feed, such as from a video camera or a plurality of video cameras at a sporting event, or a pre-recorded content, such as a television sitcom. In some implementations, video content 101 may include video content from a camera having a large field of view, such as a camera that has a 120° field of view, 180° field of view, up to a 360° field of view. Video content 101 may include frames that are rectilinear, where a rectilinear image is not distorted by a wide-angle lens, such that lines that are straight in the scene are strait in video content 101.

Executable code 140 includes one or more software modules stored in memory 130 for execution by processor 120 of computing device 110. In some implementations, executable code 140 may receive video content 101 including a plurality of frames showing a scene from a perspective of one or more real cameras. As shown in FIG. 1, executable code 140 includes 3D model module 141, virtual camera module 143, playback module 145, and viewer position module 147. Three-dimensional model module 141 may create a 3D model of a scene based on the plurality of frames of video content 101. In some implementations, 3D module 141 may create a point cloud representing the scene using a plurality of points that are visible in a plurality of frames of video content 101. Each frame of the plurality of frames of video content 101 may include a plurality of scene points, where a scene point is a point visible in a frame of video content 101. Three-dimensional model 141 may project the plurality of scene points into scene space to create a point cloud. Three-dimensional model module 141 may create 3D model 150 using the point cloud. In other implementations, 3D model module 141 may create 3D model 150 based on the parallax motion of objects in the plurality of frames of video content 101. Three-dimensional model module 141 may store 3D model 150 in memory 130.

Virtual camera module 143 is a software module for execution by processor 120. Virtual camera module 143 may construct a synthetic view of a scene of video content 101 showing the scene as it would appear from one or more additional perspectives from one or more virtual cameras. The additional perspectives shown by the virtual cameras may be located at one or more additional locations in the scene. Each synthetic view may be a view from a location where no real camera was located during the creation of video content 101. Virtual camera module 143 may construct the synthetic view using 3D model 150. Virtual camera module 143 may create a synthetic view of one or more scenes of video content 101 from the perspective of one or more virtual cameras. In some implementations, virtual camera module 143 may create one or more synthetic views from the perspective of a static virtual camera, or a dynamic virtual camera.

Playback module 145 is a software module for execution by processor 120 to play video content 101 and/or one or more synthetic views. In some implementations, playback module 145 may stream video content 101 and one or more synthetic views to display 195. Playback module 145 may adjust the scene being displayed on display 195 based on the position of the viewer in the room relative to display 195.

For example, playback module 145 may adjust the scene being displayed on display 195 so that the scene is angularly accurate. A scene may be angularly accurate when objects in the scene fill the same portion of the viewer's field of view as the objects filled in the scene from the perspective of the camera recording video content 101. Playback module 145 may display the scene from the perspective of a virtual camera at any point in the scene, based on 3D model 150. Playback module 145 may play video content 101 and/or one or more synthetic views of a scene of video content 101 filling a field of view up to 360°, or filling a solid angle up to about 4π steradians.

Viewer position module 147 is a software module for execution by processor 120 to determine and/or track a position of a viewer. In some implementations, viewer position module 147 may use wireless technology, such as WiFi, Bluetooth, etc. to determine and/or track the position of a viewer. In other implementations, viewer position module 147 may use cameras to determine and/or track the position of the viewer. In some implementations, viewer position module 147 may determine the position of the viewer in a viewing area where display 195 is located. In other implementations, viewer position module 147 may determine the position of the viewer relative to display 195.

Three-dimensional model 150 may be a 3D model of a scene created by 3D model module 141. In some implementations, 3D model 150 may include a 3D model of each scene in video content 101. For example, if video content 101 includes a plurality of scenes, 3D model 150 may include a 3D model of each scene in video content 101. 3D model 150 may include all of the color in each scene of video content 101, all of the motion in each scene of video content 101, all of the light field in each scene of video content 101, etc., for every possible view in the scene.

Communication element 160 may be a communication element enabling computing device 110 to connect other devices and/or a computer network, such as the Internet. In some implementations, communication element 110 may enable computing device 110 to connect to a wireless device for determining and/or tracking a position of a viewer. Camera 170 may be a camera for recording the position of a viewer. In some implementations, camera 170 may record the position of the viewer in a viewing area for viewing display 195 and/or camera 170 may record the position of the viewer relative to display 195.

Display 195 may be a television, a computer display, a projection display including a projector and a screen, a projection system including an array of projectors and one or more screens, etc. In some implementations, display 195 may be a flat display, such as a television display, a computer monitor, a wall or other flat projection screen, etc. In other implementations, display 195 may be curved, such as a curved panel light emitting diode (LED) display, a curved panel organic light emitting diode (OLED) display, one or more projection screens that subtend an angle greater than about 60° and up to about 360° from the position of a viewer relative to display 195. For example, display 195 may include three walls of a rectangular room, or four walls of a rectangular room. In some implementations, display 195 may include four walls, the floor, and the ceiling of a rectangular room for displaying a scene projected by one or more projectors creating a display filling a solid angle up to 4π steradians.

Figure 2:
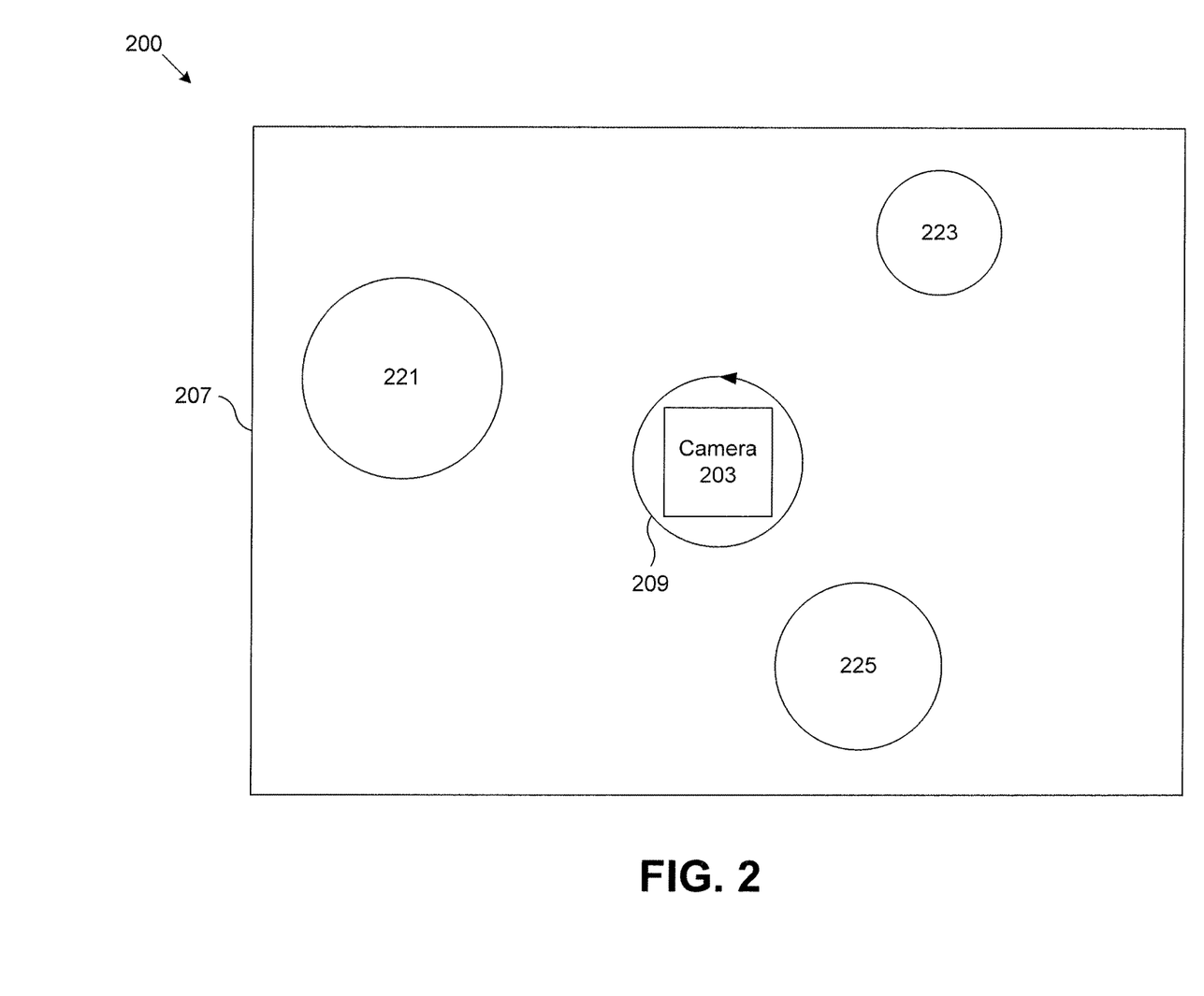
FIG. 2 shows a diagram of an exemplary environment for creating an immersive interactive video, according to one implementation of the present disclosure.

FIG. 2 shows a diagram of an exemplary environment for creating an immersive interactive video, according to one implementation of the present disclosure. Area 207 includes camera 203 having field of view 209 up to about 360°. Focal point 221, focal point 223, and focal point 225 may be objects, people, or events occurring in area 207 that may be recorded by camera 203. Camera 203 may be a single camera having field of view 209, or an array of cameras with combined fields of view aggregated to form field of view 209. In some implementations, camera 203 may be a 3D video camera. As shown in FIG. 2, camera 203 may record up to 360° field of view, enabling the scene recorded by camera 203 to record focal point 221, focal point 223, and focal point 225 in the scene. Camera 203 may record all of the color in area 207, all of the motion in area 207, all of the light field in area 207, etc. Executable code 140 may display the scene recorded by camera 203 on display 193, maintaining the appearance of the scene so that if the viewer were to move relative to display 193, the displayed scene wound appear as though camera 203 made a corresponding movement in area 207.

Figure 3:
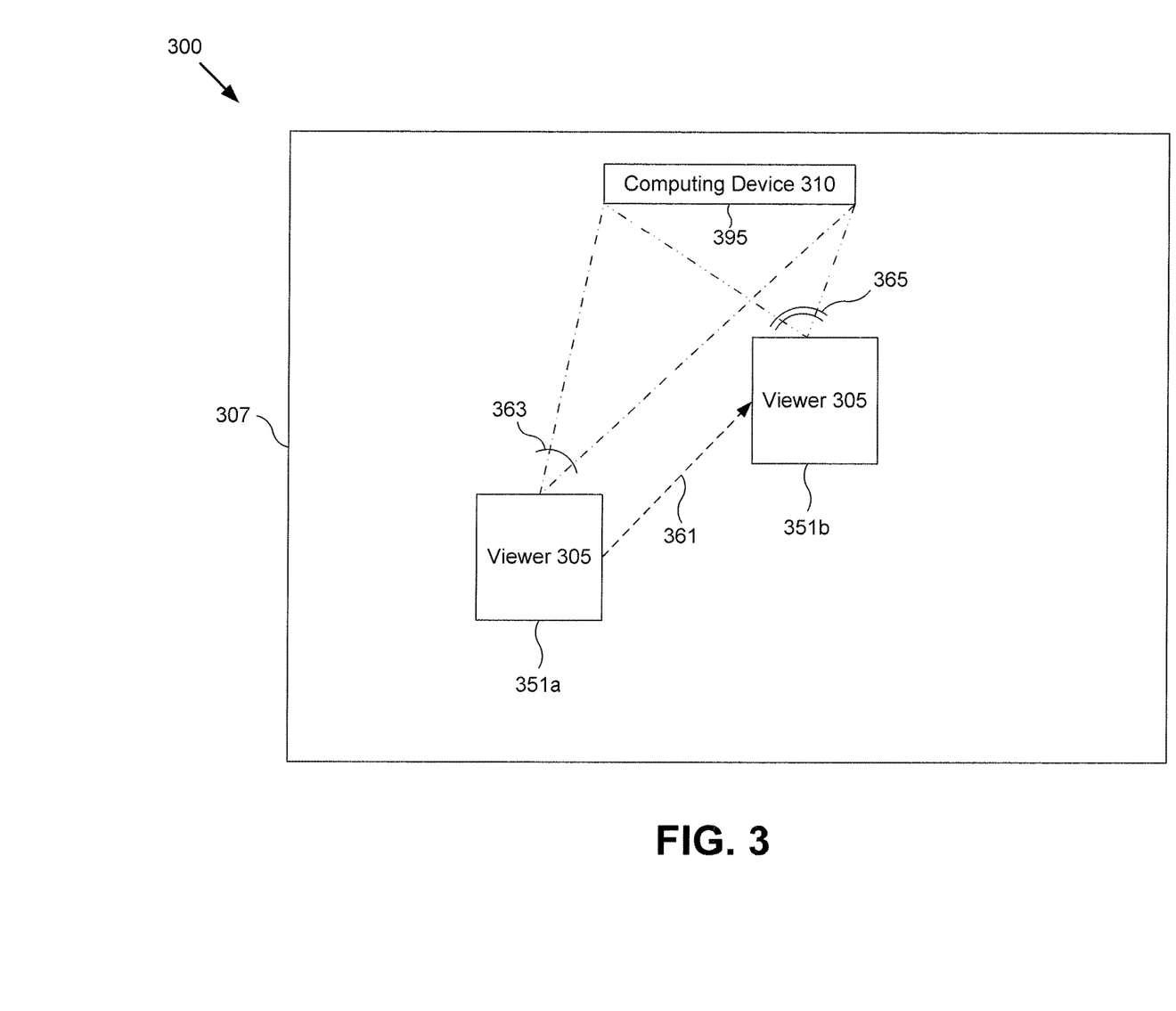
FIG. 3 shows a diagram of an exemplary environment including the system of FIG. 1, according to one implementation of the present disclosure.

FIG. 3 shows a diagram of an exemplary environment including the system of FIG. 1, according to one implementation of the present disclosure. Diagram 300 shows computing device 310 and display 395 in room 307. Viewer 305 begins at position 351a and moves to position 351b along path 361. When viewer 205 is in position 351a, display 395 may display a scene of video content 101 such that the video content is angularly accurate as seen by viewer 305. Angular accuracy of the scene of video content 101 may refer to objects in the scene subtending an angle as seen from the position of viewer 305 that is the same as the angle subtended by the objects when the scene was recorded. Playback module 145 may adjust the scene on display 395 as though display 395 were a window into the scene of video content 101. As viewer 305 moves relative to display 395, the scene displayed on display 395 changes as though viewer 395 were moving relative to the window. For example, when viewer 305 is in position 351a, viewer 305 may see the scene displayed on display 395 with a field of view of angle 363. When viewer 305 moves to position 351b, viewer 305 may see the scene displayed on display 395 with a field of view of angle 365, enabling viewer 305 to see more of the scene displayed on display 395.

Figure 4:
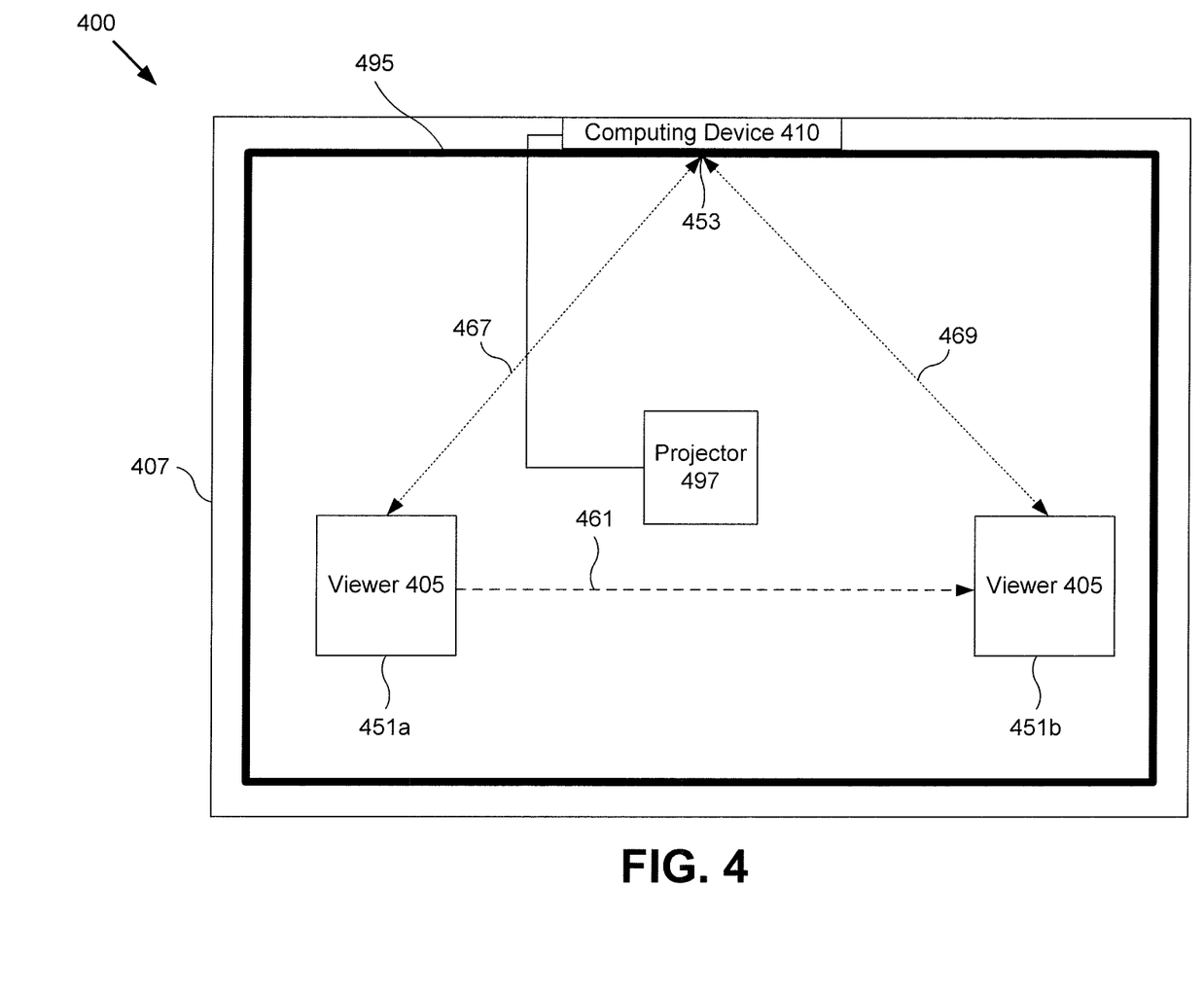
FIG. 4 shows a diagram of another exemplary environment including the system of FIG. 1, according to one implementation of the present disclosure.

FIG. 4 shows a diagram of another exemplary environment including the system of FIG. 1, according to one implementation of the present disclosure. Diagram 400 shows room 407 with computing device 410, display 395, and projector 497. Viewer 405 begins at position 451a and moves to position 451b along path 461. As shown in FIG. 4, display 395 surrounds viewer 405 and may display video content 101 as projected by projector 497. The 360° display allows viewer 405 to be fully immersed in the scene displayed on display 495. As viewer 405 moves along path 461, the field of view through which viewer 405 sees the scene displayed on display 495 would not change. However, playback module 145 may adjust the scene on display 495 as though viewer 405 were moving through the scene along path 461. Accordingly, viewer 405 may see one view of an object in the scene when viewer 405 stands at position 451a, and may see a different view of the same object in the scene when viewer 405 stands at position 451b.

For example, video content 101 may include a sporting event, such as a football game. Playback module 143 may display the football game on display 495. During the football game, a play may occur close to a sideline of the field. The view from the real camera recording the football game may not provide a definitive view of whether a player's foot was inside the field of play or out-of-bounds, ending the play. The player's foot near the field line may be displayed at location 453 on display 495. The view of viewer 405 at position 451*a* may correspond with the view of the real camera that recorded the play in the football game along line-of-sight 467. To get a more definitive view of the player's foot, viewer 405 may move to position 451*b*. Using virtual camera module 143, executable code 140 may construct a view from position 451*b* such that when viewer 405 moves to position 451*b*, viewer 405 has a view of location 453 as seen by a virtual camera at location 451*b* along line-of-sight 469. The view of the virtual camera may show what location 453 would have looked like had it been recorded by a real camera at position 451*b* and may enable viewer 405 to see location 453 from another angle and determine whether the player's foot was in-bounds or out-of-bounds in the football game.

Figure 5:
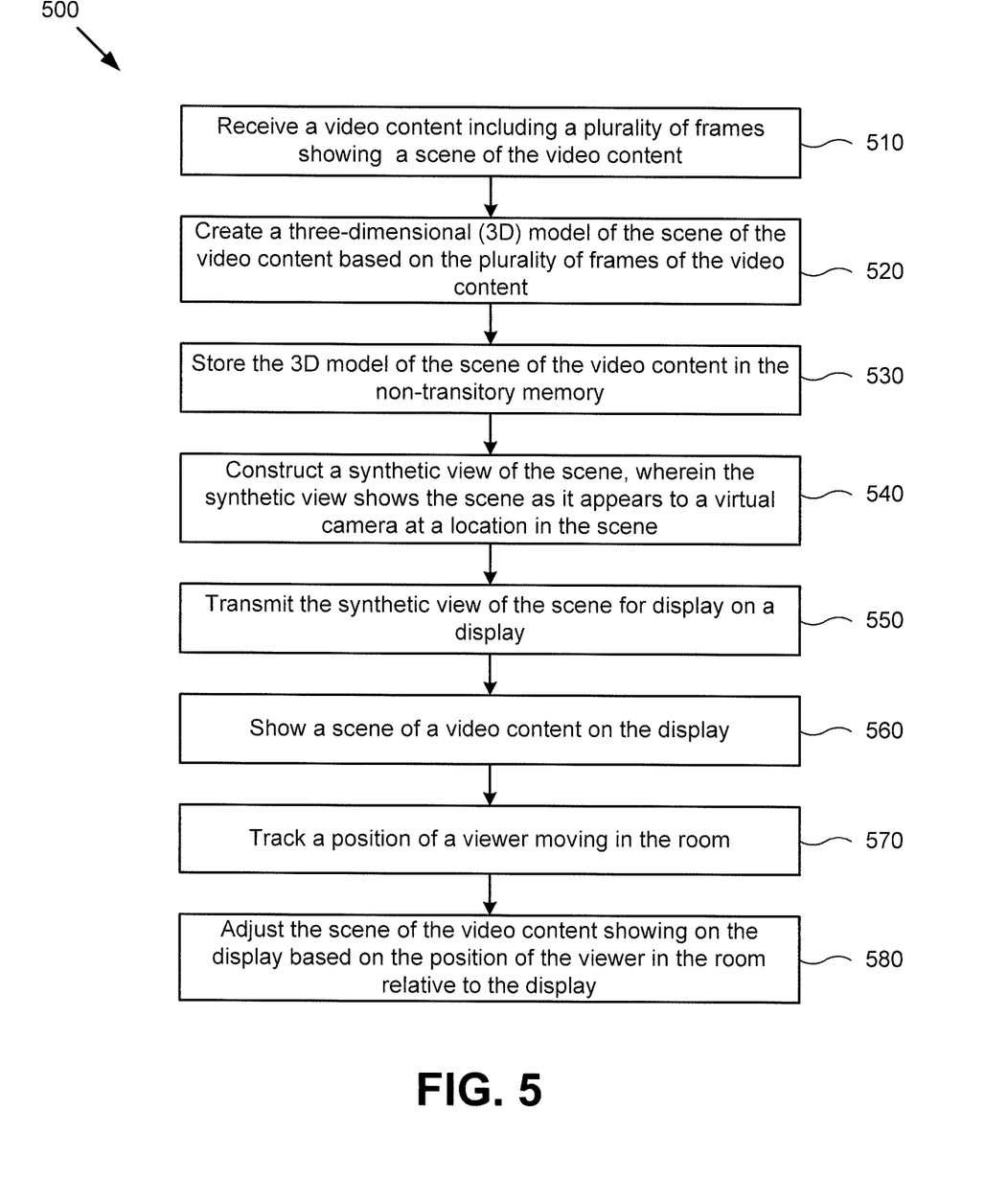
FIG. 5 shows a flowchart illustrating an exemplary method of creating an immersive interactive video system, according to one implementation of the present disclosure.

FIG. 5 shows a flowchart illustrating an exemplary method of creating an immersive interactive video system, according to one implementation of the present disclosure. Method 500 begins at 510, where executable code 140 receives a video content 101 including a plurality of frames showing a scene of video content 101. In some implementations, video content 101 may be a live feed, such as a video feed from a sporting event, or a pre-recorded video content, such as a television sitcom. Video content 101 may include a plurality of scenes, and each scene may be shown in one or more frames. In some implementations, each frame that shows a scene may show the scene from a different point of view.

At 520, executable code 140 creates a 3D model of the scene of the video content based on the plurality of frames of the video content. Three-dimensional model module 143 may use the plurality of frames of the scene from different points of view to create 3D model 150. Relying on the plurality of frames showing the scene from different points of view may enable 3D model module 143 to determine the relative position of objects in the scene based on their relative motion in each frame. Including the plurality of frames may also allow 3D model module to include objects or portions of objects that are obscured in one frame, but not in another.

In some implementations, such as when video content 101 includes a video feed from a sporting event, 3D module 143 may create a 3D model of static objects in the scene, e.g., the field and the stadium where the event is played. The 3D model of static elements of the scene may make enable 3D module 143 to quickly create a 3D model of scenes during game play because they only require modeling of the dynamic elements of the scene, such as the players moving on the field. Method 500 continues at 530, where executable code 140 stores 3D model 150 in memory 130.

At 540, executable code 140 constructs a synthetic view of the scene, wherein the synthetic view shows the scene as it appears to a virtual camera at a location in the scene. In some implementations, the viewer may choose the location of the virtual camera, allowing the viewer to view the scene from any position in the scene. In some implementations, virtual camera module 143 may construct the synthetic view of the scene in real time. Virtual camera module 143 may create a synthetic view form the viewpoint of a dynamic camera, allowing the viewer to view the scene from the view point of the dynamic virtual camera as it moves through the scene. In some implementations, virtual camera module 143 may construct the synthetic view of the scene in real time.

At 550, executable code 140 transmits the synthetic view of the scene for display on a display 195. In some implementations, computing device 110 may include display 195, and playback module 145 may display the scene on display 195. In other implementations, executable code 140 may transmit the synthetic view over a communications network, such as the Internet or a cable television network, to a media device for display on display 195.

At 560, executable code 140 shows a scene of a video content 101 on display 195. The scene shown on display 195 may include the scene as recorded by camera 203, or the scene shown on display 195 may include one or more synthetic views. In some implementations, the viewer may be able to control the scene shown on display 195 by choosing the location of a virtual camera. The user may be able to choose a static position for the virtual camera, or the viewer may be able to choose a path for a dynamic virtual camera to follow as it moves through the scene. The path may be a pre-defined path or the viewer may choose the path as the camera moves, such as by controlling the path with an input device, e.g., a joystick, a computer controller, a wireless controller, etc.

At 570, executable code 140 tracks a position of a viewer moving relative to display 195. In some implementations, viewer position module 147 may determine a position of the viewer in the room and/or the position of the viewer relative to display 195. Viewer position module 147 may track the position of the viewer relative to display 195 as the viewer moves in the room. In some implementations, viewer position module 147 may use camera 170 to determine and/or track the position of the viewer. In other implementations, At 580, executable code 140 adjusts the scene of video content 101 showing on display 195 based on the position of the viewer relative to display 195. In some implementations, executable code 140 may maintain the angular accuracy of media content displayed on display 195 by tracking the position of a viewer in the room and adjusting the displayed scene according to the current position of the viewer. An image displayed on display 195 may be angularly correct when the image appears to the viewer as it would appear if the camera recording the scene were located where the viewer is currently located. In some implementations, virtual camera module 143 may create a view from a static virtual camera or a dynamic virtual camera. When the viewer moves in the room relative to display 195, executable code 140 may track the position of the viewer as the viewer moves in the room. Virtual camera module 143 may create a view of the scene from the perspective of a dynamic virtual camera moving through the scene as the viewer moves through the room.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
 a non-transitory memory storing an executable code;
 a hardware processor executing the executable code to:
   receive a video content including a plurality of frames showing a scene from a perspective of a real camera;
   create a three-dimensional (3D) model of the scene using the plurality of frames;

store the 3D model of the scene in the non-transitory memory;
construct a synthetic view showing the scene from a first perspective of a virtual camera at a first location in the scene;
transmit the synthetic view of the scene for being displayed on a display located at a fixed position in a room;
dynamically adjust the synthetic view to show the scene from a second perspective of the virtual camera at a second location in the scene different from the first location in the scene, wherein the dynamically adjusted synthetic view of the scene is an angularly accurate display of the scene; and
transmit the dynamically adjusted synthetic view of the scene for being displayed on the display, such that the scene appears on the display as if the real camera recording the scene was located at the second location.

2. The system of claim 1, wherein the hardware processor executes the executable code to dynamically adjust the synthetic view of the scene according to a path chosen by a viewer.

3. The system of claim 1, wherein the hardware processor further executes the executable code to receive an input from a viewer to select the first location or the second location.

4. The system of claim 1, wherein the synthetic view is a dynamic view showing the scene as the scene appears from a perspective of the virtual camera dynamically moving in the scene based on the 3D model of the scene.

5. The system of claim 1, wherein the video content is one of a live event or a pre-recorded event.

6. The system of claim 1, wherein the hardware processor executes the executable code to create the 3D model of the scene of the video content in real-time.

7. The system of claim 6, wherein the hardware processor executes the executable code to construct the synthetic view in real-time.

8. The system of claim 1, wherein the hardware processor further executes the executable code to continuously adjust the synthetic view of the scene of the video content being displayed on the display according to a path chosen by a viewer.

9. The system of claim 1, wherein the display shows an angularly accurate view of the video content for up to 360 degrees around a viewer.

10. The system of claim 1, wherein the display includes a spherical display displaying the video content above and below a viewer up to 4πc steradians.

11. A method for use with a system having a non-transitory memory and a hardware processor, the method comprising:
receiving, using the hardware processor, a video content including a plurality of frames showing a scene from a perspective of a real camera;
creating, using the hardware processor, a three-dimensional (3D) model of the scene using the plurality of frames;
storing the 3D model of the scene in the non-transitory memory;
constructing, using the hardware processor, a synthetic view showing the scene from a first perspective of a virtual camera at a first location in the scene;
transmitting, using the hardware processor, the synthetic view of the scene for being displayed on a display located at a fixed position in a room;
dynamically adjusting, using the hardware processor, the synthetic view to show the scene from a second perspective of the virtual camera at a second location in the scene different from the first location in the scene, wherein the dynamically adjusted synthetic view of the scene is an angularly accurate display of the scene; and
transmitting, using the hardware processor, the dynamically adjusted synthetic view of the scene for being displayed on the display, such that the scene appears on the display as if the real camera recording the scene was located at the second location.

12. The method of claim 11, wherein the synthetic view is dynamically adjusted according to a path chosen by a viewer.

13. The method of claim 11, further comprising:
receiving, using the hardware processor, an input from a viewer to select the first location or the second location.

14. The method of claim 11, wherein the synthetic view is a dynamic view showing the scene as the scene appears from a perspective of the virtual camera dynamically moving in the scene based on the 3D model of the scene.

15. The method of claim 11, wherein the video content is one of a live event or a pre-recorded event.

16. The method of claim 11, further comprising:
creating, using the hardware processor, the 3D model of the scene of the video content in real-time.

17. The method of claim 16, further comprising:
constructing, using the hardware processor, the synthetic view in real-time.

18. The method of claim 11, further comprising:
continuously adjusting, using the hardware processor, the synthetic view of the scene of the video content being displayed on the display according to a path chosen by a viewer.

19. The method of claim 11, wherein the display shows an angularly accurate view of the video content for up to 360 degrees around a viewer.

20. The method of claim 11, wherein the display includes a spherical display displaying the video content above and below a viewer up to $4\pi$ steradians.

* * * * *